US011451735B2

(12) United States Patent
Danielyan et al.

(10) Patent No.: US 11,451,735 B2
(45) Date of Patent: Sep. 20, 2022

(54) HIGH DYNAMIC RANGE MICROMIRROR IMAGING ARRAY SYSTEMS AND METHODS

(71) Applicants: Teledyne FLIR, LLC, Thousand Oaks, CA (US); Noiseless Imaging Oy Ltd., Tampere (FI)

(72) Inventors: Aram Danielyan, Tampere (FI); Cristóvão Cruz, Tampere (FI); Alessandro Foi, Tampere (FI)

(73) Assignee: Teledyne FLIR, LLC, Thousand Oaks, CA (US)

( * ) Notice: Subject to any disclaimer, the term of this patent is extended or adjusted under 35 U.S.C. 154(b) by 282 days.

(21) Appl. No.: 16/677,395

(22) Filed: Nov. 7, 2019

(65) Prior Publication Data

US 2020/0162695 A1    May 21, 2020

Related U.S. Application Data

(60) Provisional application No. 62/770,112, filed on Nov. 20, 2018.

(51) Int. Cl.
| | | |
|---|---|---|
| *H04N 5/355* | (2011.01) | |
| *H04N 5/74* | (2006.01) | |
| *G02B 26/08* | (2006.01) | |
| *H04N 5/378* | (2011.01) | |

(52) U.S. Cl.
CPC ....... *H04N 5/7458* (2013.01); *G02B 26/0833* (2013.01); *H04N 5/355* (2013.01); *H04N 5/378* (2013.01)

(58) Field of Classification Search
CPC ........ H04N 5/355; H04N 5/357; H04N 5/378; H04N 5/7458; G02B 26/0833
See application file for complete search history.

(56) References Cited

U.S. PATENT DOCUMENTS

| 2011/0157419 A1 | 6/2011 | Nayar et al. | |
| 2013/0128042 A1* | 5/2013 | Bridge ................... | H04N 5/232 348/143 |
| 2018/0330473 A1 | 11/2018 | Foi et al. | |

FOREIGN PATENT DOCUMENTS

| CN | 104620282 | 1/2018 |
| EP | 2873058 | 12/2016 |
| JP | 2010233241 A * | 10/2010 |

OTHER PUBLICATIONS

Nayar et al., "High dynamic range imaging: spatially varying pixel exposures", IEEE Conference on Computer Vision and Pattern Recognition. CVPR 2000 (Cat. No. PR00662), vol. 1, pp. 472-479, 2000.

(Continued)

*Primary Examiner* — Kevin K Pyo
(74) *Attorney, Agent, or Firm* — Haynes and Boone, LLP

(57) ABSTRACT

A system comprises a digital micromirror device (DMD), an image sensor comprising an array of sensors operable to capture an image of a scene, a readout integrated circuit (ROIC) operable to generate signals from the sensors corresponding to the captured image of the scene, and an image reconstruction module. The image sensor is operable to capture an image of a scene and comprises an array of photodetector sensors operable to capture an image of a scene at a first frame rate, and a read a readout integrated circuit (ROIC) operable to generate signals from the photodetector sensors corresponding to the captured image of the scene at a second frame rate. A digital micromirror device (DMD) comprising a plurality of micromirrors, each micromirror having at least two physical states, and control circuitry operable to separately control the state of each micromirror, the digital micromirror device operable to receive the image of a scene and reflect the image to the image sensor, whereby the image sensor captures the (Continued)

reflected image of the scene. A processing component is operable to control the operation of the DMD and reconstruct the image from the ROIC.

18 Claims, 11 Drawing Sheets

(56) References Cited

OTHER PUBLICATIONS

Aguerrebere et al., "Single shot high dynamic range imaging using piecewise linear estimators", 2014 IEEE International Conference on Computational Photography (ICCP), pp. 1-10, May 2014.
Schoberl et al., "High dynamic range video by spatially non-regular optical filtering", 2012 19th IEEE International Conference on Image Processing, pp. 2757-2760, Sep. 2012.
Chang et al., "Color filter array recovery using a threshold-based variable number of gradients", vol. 3650, pp. 36-43, 1999.
Veeraraghavan et al., "Programmable pixel compressive camera for high speed imaging", Computer Vision and Pattern Recognition (CVPR), 2011 IEEE Conference on, pp. 329-336. IEEE.
Maggioni et al. "Joint removal of random and fixed-pattern noise through spatiotemporal video filtering," Image Processing, IEEE Transactions on, vol. 23, No. 10, pp. 4282-4296, 2014.
Wang et al., "Variable density compressed image sampling," in 2009 17th European Signal Processing Conference, Aug. 2009, pp. 2022-2026.

\* cited by examiner

HIGH DYNAMIC RANGE MICROMIRROR IMAGING ARRAY SYSTEMS AND METHODS

CROSS-REFERENCE TO RELATED APPLICATIONS

This application claims the benefit of and priority to U.S. Provisional Patent Application No. 62/770,112 filed Nov. 20, 2018 and entitled "HIGH DYNAMIC RANGE MICROMIRROR IMAGING ARRAY SYSTEMS AND METHODS," which is incorporated herein by reference in its entirety. This application is related to U.S. Provisional Patent Application No. 62/612,306 filed Dec. 29, 2017 and entitled "HIGH DYNAMIC RANGE MICROMIRROR IMAGING ARRAY SYSTEMS AND METHODS," which is incorporated herein by reference in its entirety.

TECHNICAL FIELD

One or more embodiments of the present disclosure relate generally to imaging devices and more particularly, for example, to high dynamic range imaging devices utilizing digital micromirror optical elements.

BACKGROUND

There are a wide variety of image detectors, such as visible image detectors, infrared image detectors, or other types of image detectors that may be provided in an image detector array for capturing an image. As an example, a plurality of sensors may be provided in an image detector array to detect electromagnetic radiation at desired wavelengths. Such detectors may be connected to or part of unit cells in a read out integrated circuit (ROIC) which capture image data in response to the detected radiation and then communicate that image data to external electronics. The combination of a detector array with an ROIC is known either as a focal plane array (FPA) or an image sensor. Advances in process technology for FPAs and image processing have led to increased capabilities and sophistication of resulting imaging systems. Many imaging applications face challenges when imaging scenes having a large dynamic range. Thus, there is a continued need in the art for more efficient, accurate and higher quality imaging systems for use across a range of imaging environments.

SUMMARY

Various techniques are provided for implementing high dynamic range imaging utilizing digital micromirror device (DMD) optical elements. In various embodiments, a DMD optical element varies the effective integration time and reconstructs high dynamic range (HDR) video from the recorded data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Various embodiments for implementing high dynamic range imaging utilizing digital micromirror device (DMD) optical elements are disclosed. The systems and method disclosed herein facilitate noise-free video with a dynamic range that is significantly higher than conventional imaging sensors are capable of delivering in similar environments.

In one or more embodiments, a DMD optical element varies the effective integration time and high dynamic range (HDR) video is reconstructed from the recorded data. The integration times may be varied, for example, based on measured signal intensities or other sensed data within the captured image. For example dark areas could use an integration time close to the maximum allowed by the read out integrated circuit (ROIC) with bright areas using very short integration times so as not to saturate the sensor. In various embodiments, the integration time is defined and varied by the DMD rather than the image sensor ROIC. The method for varying the effective integration time and reconstructing a noiseless high dynamic range video may comprise interpolation, spectral density estimation, and noise reduction for the HDR data.

Various embodiments of the present disclosure implement optical configurations having a one-to one correspondence between DMD micromirrors and sensor photodetectors. In such embodiments, it may be assumed that each micromirror modulates the exposure of a single photodetector. However this limitation is not strict (or realistic for many applications) and various embodiments are disclosed for addressing a small blur point spread function between the DMD micromirrors and sensor photodetectors.

High dynamic range (HDR) imaging poses challenges in addressing spatially varying pixel exposures. The systems and methods disclosed herein address the exposure pattern and image reconstruction. It is known that the exposure pattern can follow regular or (pseudo-) random patterns. Regular exposure patterns allow the use of simpler interpolation methods for reconstructing clipped pixel values, while pseudorandom patterns typically use more sophisticated interpolation techniques based on iterative procedures. Coupled with an efficient reconstruction algorithm as disclosed herein, the present disclosure uses pseudorandom patterns to deliver better reconstructed image quality than regular patterns. Regular sampling is also used in various embodiments to reduce or avoid computationally heavy iterative reconstruction procedures.

Figure 1:
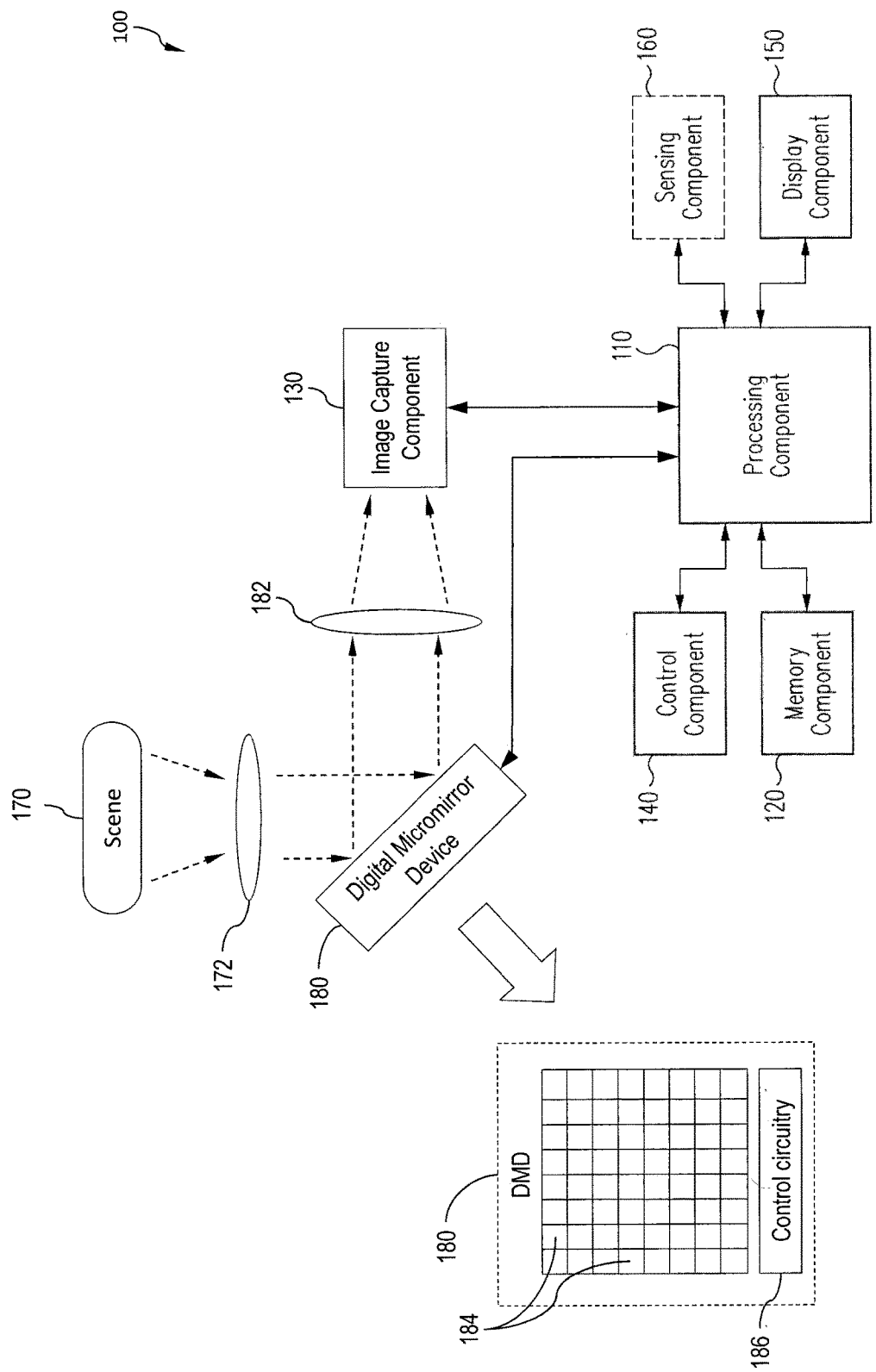
FIG. 1 illustrates an example imaging system in accordance with one or more embodiments of the disclosure.

Referring to FIG. 1, an exemplary high dynamic range (HDR) imaging system 100 in accordance with one or more embodiments of the present disclosure will now be described. As illustrated, the HDR imaging system 100 comprises a processing component 110, a memory component 120, an image capture component 130, a control component 140, a display component 150, and a digital micromirror device (DMD) 180. System 100 may further include a sensing component 160 and other system components for implementation of a particular imaging system.

The HDR imaging system 100 captures and processes HDR video using sensors of the image capture component 130. The image capture component 130 may capture a scene 170 reflected from the mirrors 184 of a digital micromirror device (DMD) 180. One or more lens 172 projects the scene 170 onto the mirrors 184 of the DMD 180 and one or more lens 182 focuses the reflected light onto the sensors of the image capture component 130. In various embodiments, the DMD 180 may include several hundred thousand microscopic mirrors each with surfaces several microns in size that may be tilted (e.g., approximately 12 degrees off the DMDs' optical axis) to turn "on" or "off" each individual mirror under control of control circuitry 186 and processing component 110. The HDR imaging system 100 is operable to reconstruct (interpolate) saturated or underexposed pixels from the captured data, compute a power-spectral density of the noise with respect to a 3-D transform applied to a group of blocks extracted from the interpolated video, and remove detected noise from the interpolated video using method for computing power spectral density.

HDR imaging system 100 may represent, for example, an imaging system such as an infrared imaging device, or a multi-band imaging device for capturing and processing images, such as video images of a scene 170. In some embodiments, system 100 may represent any type of infrared camera adapted to detect infrared radiation and provide representative data and information (e.g., infrared image data of a scene) or may represent more generally any type of electro-optical sensor system. As examples, system 100 may represent an infrared camera, a dual band imager such as a night vision imager that operates to sense reflected visible and/or short-wave infrared (SWIR) light for high resolution images and long-wave infrared (LWIR) radiation for thermal imaging, or an imager for sensing both short wave and long wave radiation simultaneously for providing independent image information. System 100 may comprise a portable device and may be incorporated, e.g., into a vehicle (e.g., hand-held devices, an automobile or other type of land-based vehicle, an aircraft, a marine craft, or a spacecraft) or a non-mobile installation (e.g., a video surveillance system or medical imaging system) requiring images to be stored and/or displayed or may comprise a distributed networked system.

In various embodiments, processing component 110 may comprise any type of a processor or a logic device (e.g., a programmable logic device (PLD) configured to perform processing functions). Processing component 110 may be adapted to interface and communicate with components 120, 130, 140, 150 and 180 to perform method and processing steps and/or operations as described herein such as controlling the operation of DMD, controlling biasing and other functions (e.g., values for elements such as variable resistors and current sources, switch settings for timing such as for switched capacitor filters, ramp voltage values, etc.) along with conventional system processing functions as would be understood by one skilled in the art.

Memory component 120 comprises, in one embodiment, one or more memory devices adapted to store data and information, including for example infrared data and information. Memory device 120 may comprise one or more various types of memory devices including volatile and non-volatile memory devices. Processing component 110 may be adapted to execute software stored in memory component 120 so as to perform method and process steps and/or operations described herein.

Image capture component 130 comprises, in one embodiment, any type of image sensor, such as, for example, an image sensor having one or more image detector elements such as infrared photodetector elements (e.g., any type of multi-pixel infrared detector, such as a focal plane array as described hereinafter) for capturing infrared image data (e.g., still image data and/or video data) representative of an scene such as scene 170. In one or more embodiments, the image capture component 130 comprises a camera system where the integration times of the photo-sensitive elements can be controlled individually. In various embodiments the image capture component 130 is operable to variably control integration times of one or more photo-sensitive elements and the HDR system is operable to reconstruct noise-free (or noise reduced) HDR video from capture noisy data.

If desired, image capture component 130 may include one or more arrays of other detector elements such as uncooled detector elements (e.g., uncooled microbolometer sensors), cooled detector elements (e.g., detector elements such as photovoltaic or quantum structure elements that are cooled using a cryogen coupled to the array or using a refrigeration system), InSb detector elements, quantum structure detector elements, InGaAs detector elements, or other types of sensors.

In one implementation, image capture component 130 may be configured to generate digital image data representing incoming image light from scene 170. Image capture component 130 may include one or more signal processing components such as analog-to-digital converters included as part of an infrared sensor or separate from the infrared sensor as part of system 100. In one aspect, infrared image data (e.g., infrared video data) may comprise non-uniform data (e.g., real image data) of a scene such as scene 170. Processing component 110 may be adapted to process the infrared image data (e.g., to provide processed image data), store the infrared image data in memory component 120, and/or retrieve stored infrared image data from memory component 120. For example, processing component 110 may be adapted to process infrared image data stored in memory component 120 to provide processed image data and information (e.g., captured and/or processed infrared image data).

Control component 140 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 110 may be adapted to sense control input signals from a user via control component 140 and respond to any sensed control input signals received therefrom. Processing component 110 may be adapted to interpret such a control input signal as a parameter value, as generally understood by one skilled in the art.

In one embodiment, control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art.

In one embodiment, control component 140 may optionally include temperature control components for cooling or heating an image sensor. Temperature control components may include a container such as a Dewar containing a cryogenic liquid and a thermally conductive coupling member coupled between the cryogenic liquid and a sensor structure on which an array of detectors is formed. However, this is merely illustrative. If desired, image capture component 130 may be an uncooled image capture component.

Display component 150 comprises, in one embodiment, an image display device (e.g., liquid crystal displays (LCD) or various other types of generally known video displays or monitors). Processing component 110 may be adapted to display image data and information on the display component 150. Processing component 110 may be adapted to retrieve image data and information from memory component 120 and display any retrieved image data and information on display component 150. Display component 150 may comprise display electronics, which may be utilized by processing component 110 to display image data and information (e.g., infrared images). Display component 150 may be adapted to receive image data and information directly from image capture component 130 via the processing component 110, or the image data and information may be transferred from memory component 120 via processing component 110.

Sensing component 160 comprises, in one embodiment, one or more sensors of various types, depending on the application or implementation requirements, as would be understood by one skilled in the art. The sensors of optional sensing component 160 provide data and/or information to at least processing component 110. In one aspect, processing component 110 may be adapted to communicate with sensing component 160 (e.g., by receiving sensor information from sensing component 160) and with image capture component 130 (e.g., by receiving data and information from image capture component 130 and providing and/or receiving command, control, and/or other information to and/or from one or more other components of system 100).

In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the data provided by image capture component 130.

In some implementations, an optional sensing component 160 (e.g., one or more of sensors) may comprise devices that relay information to processing component 110 via wired and/or wireless communication. For example, optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of HDR system 100 may be combined and/or implemented or not, as desired or depending on the application or requirements, with system 100 representing various functional blocks of a related system. In one example, processing component 110 may be combined with memory component 120, image capture component 130, display component 150, and DMD 180. In another example, processing component 110 may be combined with image capture component 130 with only certain functions of processing component 110 performed by circuitry (e.g., a processor, a microprocessor, a logic device, a microcontroller, etc.) within image capture component 130. Furthermore, various components of system 100 may be remote from each other (e.g., image capture component 130 may comprise a remote sensor with processing component 110, etc. representing a computer that may or may not be in communication with image capture component 130).

Figure 2:
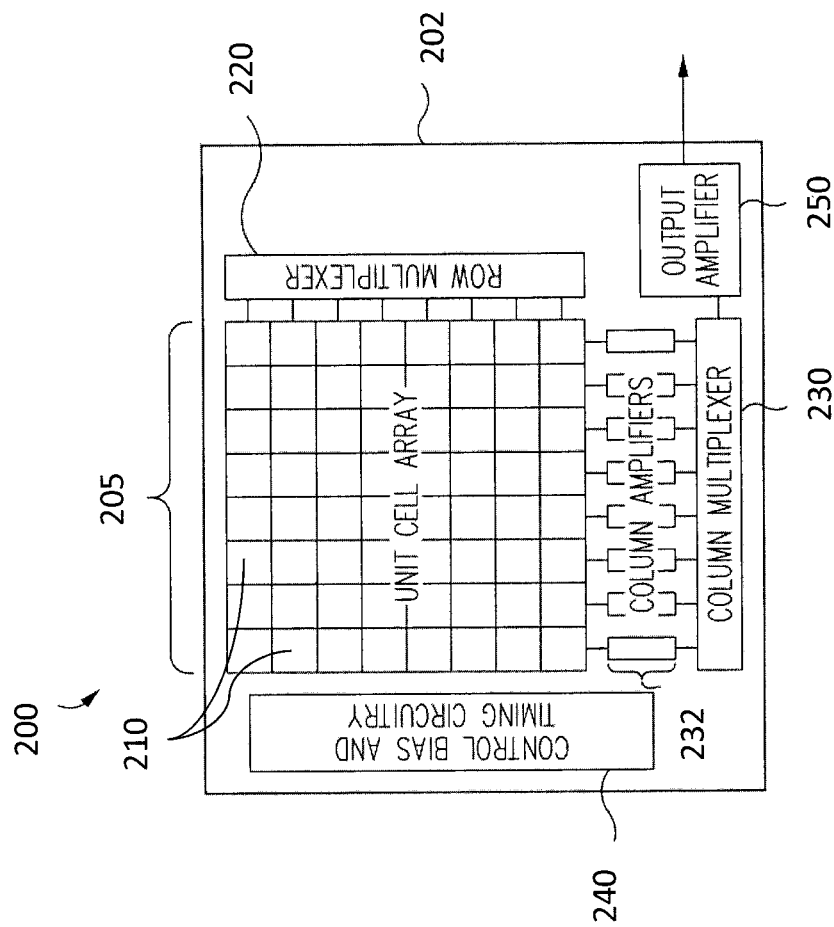
FIG. 2 illustrates a block diagram of a sensor assembly including an array of imaging sensors in accordance with one or more embodiments of the disclosure.

FIG. 2 is a block diagram of an image sensor assembly 200 in accordance with an embodiment of the invention. The image sensor assembly 200 may be a focal plane array, for example, implemented as an image sensor in image capture component 130 of FIG. 1. In the illustrated embodiment, the image sensor assembly 200 includes an array of imaging sensors 205 (e.g., photodiode sensors) provided as part of a unit cell array of a read out integrated circuit (ROIC) 202. The ROIC 202 includes bias generation and timing control circuitry 240, column amplifiers 232, a column multiplexer 230, a row multiplexer 220, and an output amplifier 250. Image frames (e.g., images) captured by image sensors 205 may be provided by output amplifier 250 to processing component 110 and/or any other appropriate components to perform various processing techniques described herein. Although an 8 by 8 array is shown in FIG. 2, any desired array configuration may be used in other embodiments. In one embodiment, there is a one-to-one correspondence between the mirrors 184 of DMD 180 (FIG. 1) and the imaging sensors 205 of the image sensor assembly 200.

The image sensor assembly 200 may capture images (e.g., image frames) and provide such images from its ROIC 202 at various rates. In some embodiments, each unit cell 210 may be configured to integrate and readout image signals generated by detectors in multiple detector rows. In this type of configuration, a single unit cell 210 may be used to integrate charges, during multiple integration times, from multiple detectors, including detectors associated with other unit cells 210. For example, a unit cell 210 in a first row may be used to integrate image charges from its associated detector and from one or more detectors in adjacent detector rows.

Processing component 110 of FIG. 1 may be used to perform appropriate processing of captured images and may be implemented in accordance with any appropriate architecture. In one embodiment, processing component 110 may be implemented as an ASIC. In this regard, such an ASIC may be configured to perform image processing with high performance and/or high efficiency. In another embodiment, processing component 110 may be implemented with a general purpose central processing unit (CPU) which may be configured to execute appropriate software instructions to perform image processing, coordinate and perform image processing with various image processing blocks, coordinate interfacing between processing component 110 and a host device, and/or other image processing operations. Processing module 110 may be implemented with other types of processing and/or logic circuits in other embodiments as would be understood by one skilled in the art.

One or more control circuits may be provided as part of and/or separate from imaging sensor assembly 200 to provide various signals further described herein. Such control circuits may be implemented in accordance with any appropriate control circuits such as one or more processors (e.g., processing components 110), logic, clocks, and/or other circuits as may be desired for particular implementations. In various embodiments, the components of the system 100 and/or imaging sensor 200 may be implemented as a local or distributed system with components in communication with each other over wired and/or wireless networks. Accordingly, the various operations identified in this disclosure may be performed by local and/or remote components as may be desired in particular implementations.

Figures 3A, 3B:
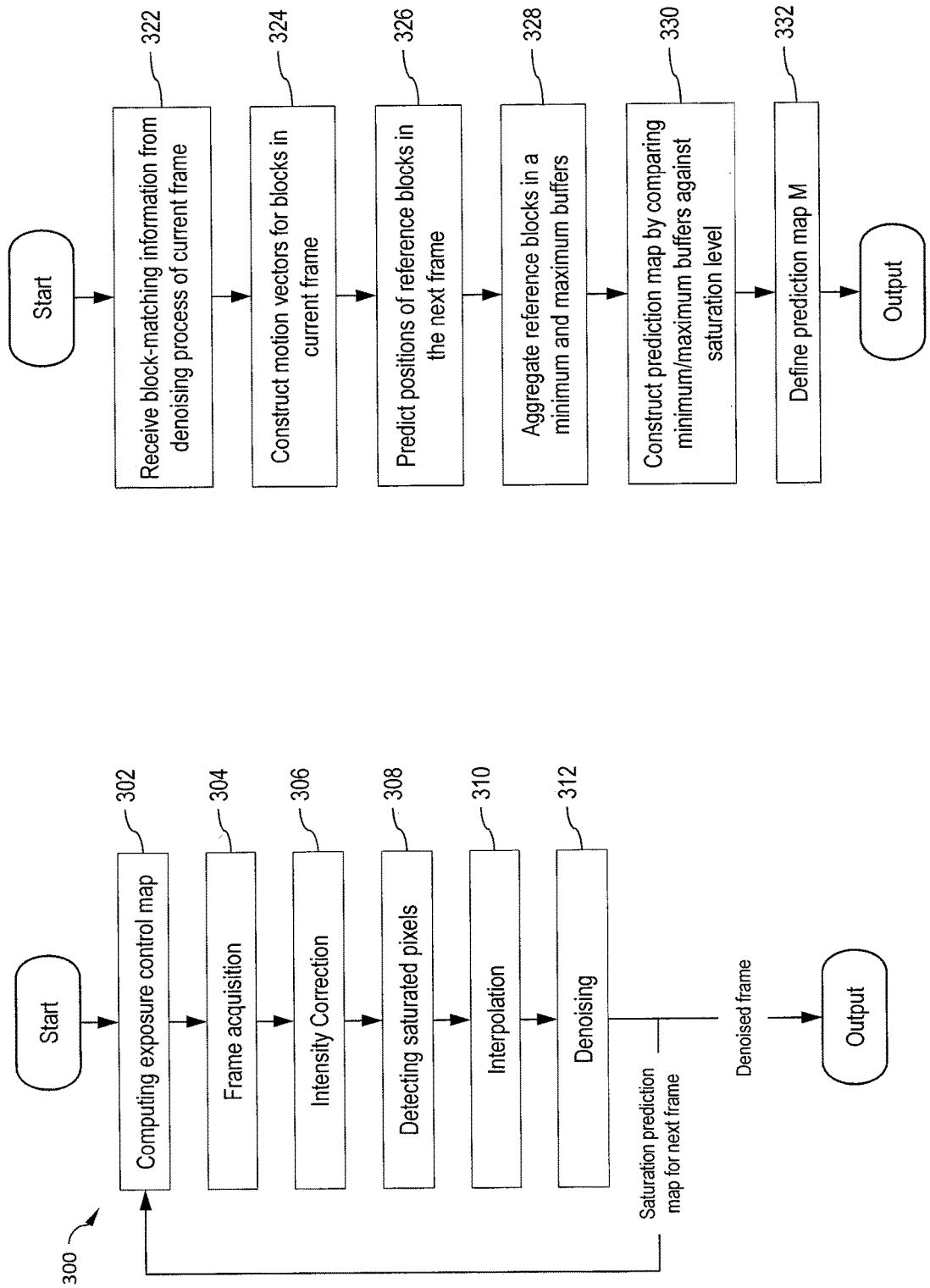
FIGS. 3A and 3B are block diagrams of a high dynamic range imaging algorithms in accordance with one or more embodiments of the disclosure.

FIG. 3A illustrates an exemplary process 300 for performing HDR imaging using the HDR imaging system 100 of FIG. 1, in accordance with one or more embodiments of the present disclosure. Before capturing the frame the processing components compute the exposure control map in step 302. In one embodiment, the exposure control map is a binary array which specifies whether a corresponding pixel has a long (1) or short (0) exposure. During frame acquisition in step 304 the DMD mirrors 184 are controlled in accordance with the exposure control map. In step 306, after an image frame is captured by the image capture component 130, image processing of the frame starts by correcting the intensities of the short-exposure pixels by scaling the short-exposure pixels to the intensity range of the long-exposure data. In step 308, in the intensity-corrected image the positions of the saturated long-exposure pixels are identified and in step 310 image values at those positions are estimated by interpolation. After interpolation, the frame is denoised (e.g., V-BM4D denoising) in step 312 and output to the system for storage or further processing. Block-matching information obtained from the denoising process is used to build a map predicting pixel positions in the next frame where the signal is predicted to saturate under long exposure. The prediction map is then used in step 302 to compute the exposure control map for the next frame. Additional details and embodiments of the steps 302-312 of method 300 are discussed, below.

Exposure Control

Figure 4A:
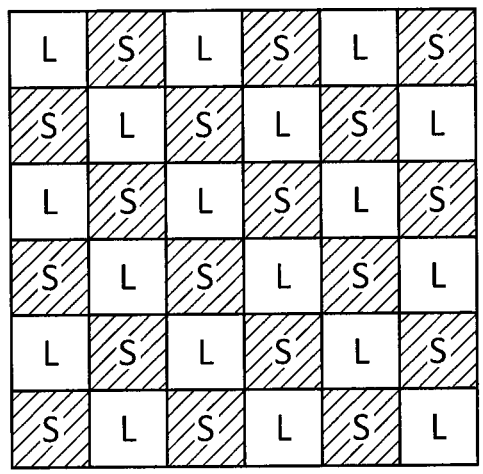
FIGS. 4A, 4B and 4C illustrate example pixel patterns for use with a digital micromirror device in accordance with one or more embodiments of the disclosure.

In step 302, the processing components compute the exposure control map for the DMD (e.g., DMD 180 of FIG. 1). An exemplary exposure control map is illustrated in FIG. 4A. In this example, the long (L) and short (S) exposure pixels are arranged in a checkerboard pattern. This is a relatively simple exposure configuration where pixels can have one of two exposure times: $T_{long}$ or $T_{short}$. In one embodiment, both $T_{long}$ and $T_{short}$ are constant in time and the ratio between long and short exposure times are denoted by K, such that:

$$K = \frac{T_{long}}{T_{short}} > 1.$$

Figure 4B:
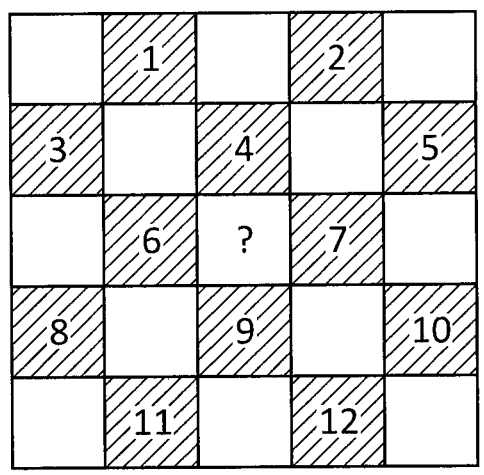
Figure 4C:
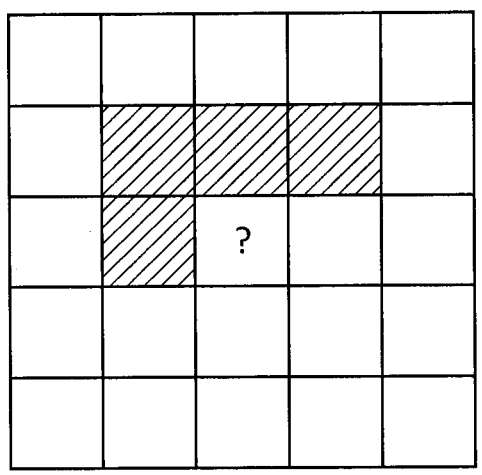

The checkerboard pattern, as shown in FIG. 4A allows the system to reconstruct saturated pixel values with a simple interpolation technique, such as demosaicking using a Bayer filter as known in the art. The checkerboard configuration is also characterized in that surrounding each unknown pixel there may be, for example, up to 12 neighboring known pixels which can be used for reconstructing the current pixel. This is illustrated in FIG. 4B for an unknown pixel denoted by "?". Using directional interpolation, the unknown white pixel, "?", at the center is surrounded by 12 known gray pixels. Referring to FIG. 4C, the unknown pixel, "?", can also be interpolated using other arrangements, such as from known adjacent pixels.

The checkerboard pattern of FIG. 4A is used for video capturing. In one embodiment, the long and short pixels are alternated at every frame such that the upper-left corner of the checkerboard pattern has a long exposure at even frames and short exposure at odd frames. Such alternation allows the system to avoid a situation where for a bright static scene only half of the pixels are captured.

The prediction map P indicating areas in the future frame where signal saturation is expected is generated using an adaptive approach that uses information from the preceding frames. The system modifies the exposure control map to apply short exposure in the areas where saturation is predicted and long exposure in other areas. It is noted, however, that the prediction may not be accurate, for example, due to imprecise motion prediction or occlusions. Areas around edges of objects having high contrast with respect to the background or other objects are also prone to prediction errors. To minimize the risk of saturation a hybrid exposure sampling approach is used in the present embodiment. In the areas where there is high confidence about the prediction pixels of a single type are used (either long or short), while in the areas where there is low confidence pixels of both types arranged in a checkerboard pattern may be used.

In one embodiment, the prediction map P is constructed as illustrated in FIG. 3B. Block-matching information from the denoising step (step 312) is received in step 322 and motion vectors for all reference blocks in the current (last acquired) frame are constructed in step 324. A motion-vector contains the difference between coordinates of the reference block and the matched block in the previous frame. Assuming constant velocity model, computed motion vectors are used to predict the positions of the reference blocks in the future frame in step 326. The reference blocks are then moved to the new positions and their content is aggregated in two buffers in step 328. The first buffer contains the minimum over all estimates from the reference blocks, and the second buffer contains the maximum.

The prediction map is constructed in step 330 by comparing values in the minimum and maximum buffers against the saturation level. For those spatial positions x where the maximum buffer has values less than saturation level the system predicts that there will probably not be saturation, and the corresponding positions in the prediction map P (x) are assigned a value of 1. For those positions where the minimum buffer has values greater or equal to the saturation level, the system predicts that there will probably be saturation and the corresponding positions in the prediction map are assigned a value of −1. All other positions in the map are set to 0, indicating that for those pixels the system was unable to make a confident prediction. For some positions the minimum and maximum buffers may not have data, since no reference block moves to cover those positions. For those positions P (x) is set to 0.

After P is constructed the exposure control map M is defined in step 332. M is initialized with a checkerboard pattern, setting M (x)=1 for having long exposure at position x, and M (x)=0 for short. Then M is updated using the prediction map P as follows:

$$M(x) = \begin{cases} 1, & \text{if } P(x) = 1 \\ 0, & \text{if } P(x) = -1 \\ M(x), & \text{if } P(x) = 0 \end{cases} \quad (1)$$

Figure 5:
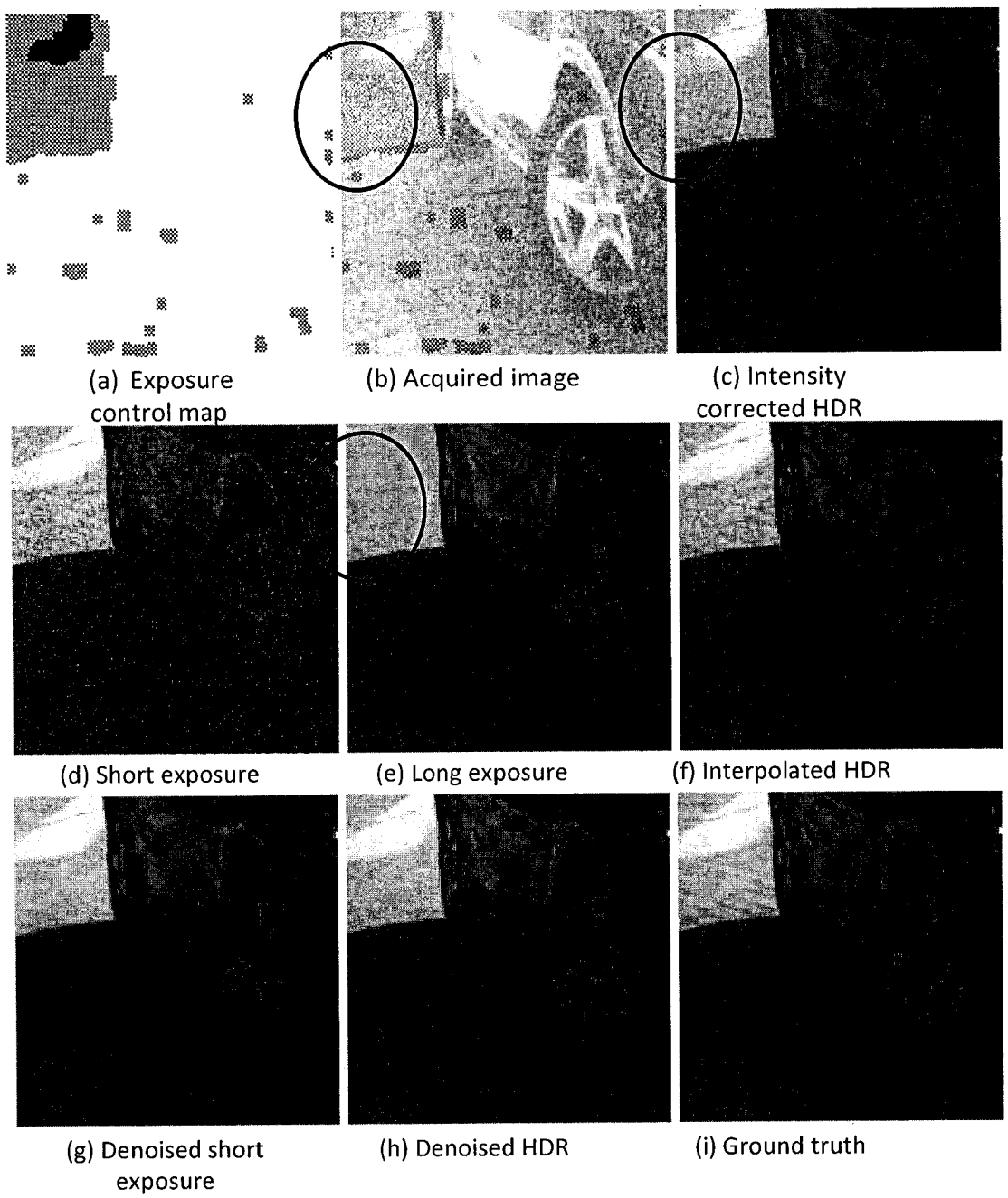
FIG. 5 illustrates examples of various frame processing results in accordance with one or more embodiments of the disclosure.
Figure 6:
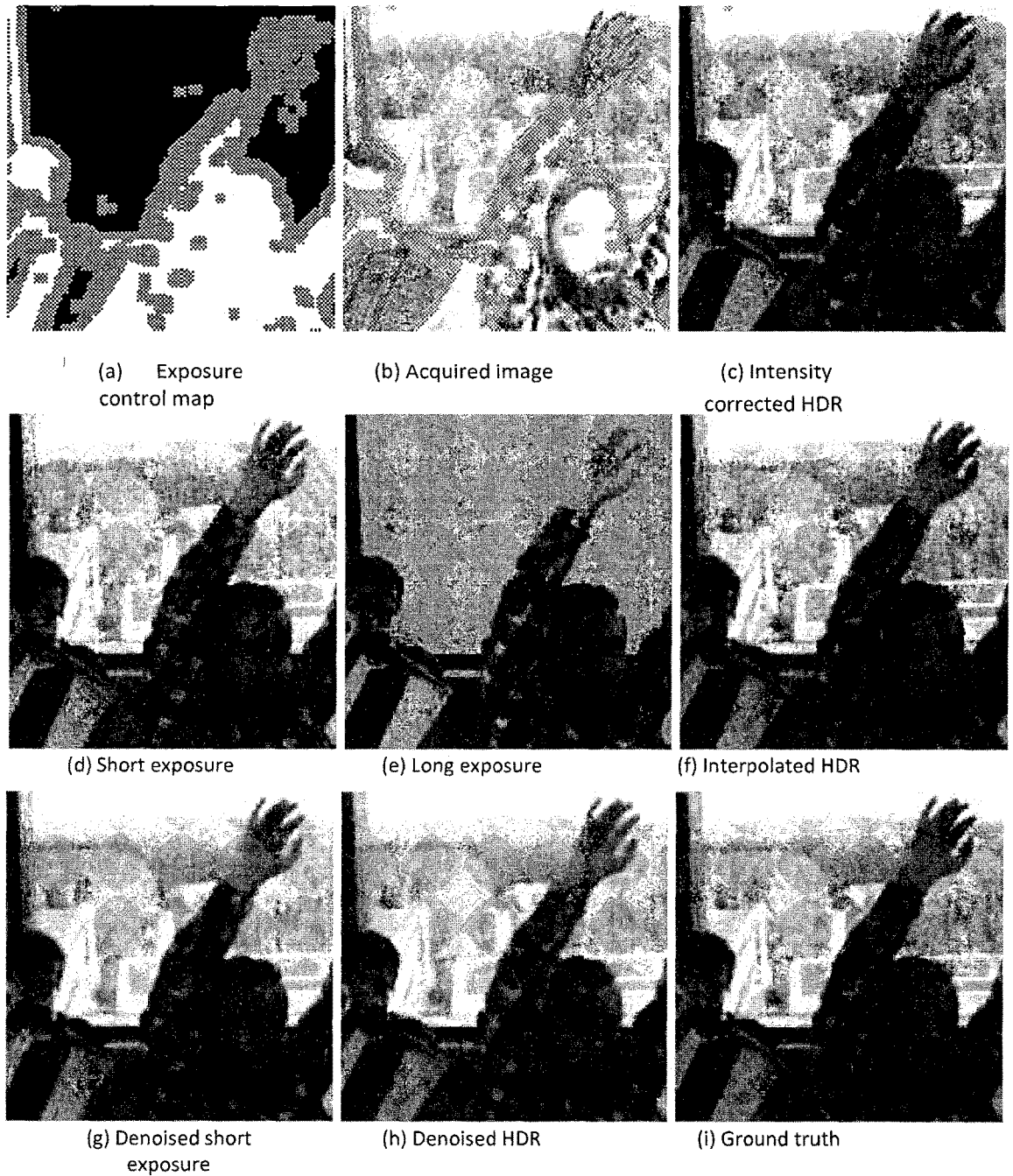
FIG. 6 illustrates examples of various frame processing results in accordance with one or more embodiments of the disclosure.

Examples of computed prediction maps M are shown in FIGS. 5 (image (a)) and 6 (image(a)). FIG. 5 illustrates processing stages of the 8th frame of an exemplary car sequence, with K=8. Saturated long exposure pixels are shown in the circle in image (c). For a comparison also shown is a frame entirely acquired using short exposure (d) and its denoising result (g), a frame entirely acquired using long exposure (e), and the ground truth frame (i). FIG. 6 illustrates processing of the $8^{th}$ frame of an exemplary office sequence, with K=4. Saturated long exposure pixels are shown in light red. For a comparison also shown is a frame entirely acquired using short exposure (d) and its denoising result (g), a frame entirely acquired using long exposure (e), and the ground truth frame (i).

Interpolation

The interpolation step 310 (FIG. 3A) implements a demosaicking algorithm. Assuming that in the 5×5 neighborhood I of the unknown pixel we have 12 known pixels which are arranged in a checkerboard pattern and numbered according to the scheme in FIGS. 4B and 4C. The interpolation procedure starts by computing moduli of 8 directional derivatives:

$$\begin{aligned} G_N &= |I(4) - I(9)| + 0.5|I(1) - I(6)| + 0.5|I(2) - I(7)|, \\ G_E &= |I(7) - I(6)| + 0.5|I(5) - I(4)| + 0|.5|I(10) - I(9)|, \\ G_S &= |I(9) - I(4)| + 0.5|I(12) - I(7)| + 0.5|I(11) - I(6)|, \\ G_W &= |I(6) - I(7)| + 0.5|I(8) - I(9)| + 0.5|I(3) - I(4)|, \\ G_{NE} &= 0.5|I(4) - I(6)| + 0.5|I(2) - I(4)| + \\ &\quad 0.5|I(7) - I(9)| + 0.5|I(5) - I(7)|, \\ G_{SE} &= 0.5|I(7) - I(4)| + 0.5|I(10) - I(7)| + \\ &\quad 0.5|I(9) - I(6)| + 0.5|I(12) - I(9)|, \\ G_{SW} &= 0.5|I(9) - I(7)| + 0.5|I(11) - I(9)| + \\ &\quad 0.5|I(6) - I(4)| + 0.5|I(8) - I(6)|, \\ G_{NW} &= 0.5|I(6) - I(9)| + 0.5|I(3) - I(6)| + \\ &\quad 0.5|I(4) - I(7)| + 0.5|I(1) - I(4)|. \end{aligned} \quad (2)$$

Here I(k) is the value of the k-th known pixel. The algorithm attempts to find directions along which the signal has minimal change and perform interpolation only along those directions. Selection of the directions may be performed with the following thresholding rule:

$$D_s(x) = \{d \in | D, \text{ so that } G_d(x) \le T(x)\},$$

$$D = \{N, E, S, W, NE, SE, SW, NW\}$$

$$T(x) = \min_{d \in D}(G_d(x)) + 0.3\max_{d \in D}(G_d(x))$$

Here $D_s(x)$ is the subset of directions at the position x along which the module of directional derivative $G_d$ is less than the threshold level T (x). Once directions are selected the corresponding directional estimates are computed using the formulas:

$$E_N = I(4),$$

$$E_E = I(7),$$

$$E_S = I(9),$$

$$E_W = I(6),$$

$$E_{NE} = I(4) + I(7) + 0.5I(2) + 0.5I(5),$$

$$E_{SE} = I(7) + I(9) + 0.5I(10) + 0.5I(12),$$

$$E_{SW} = I(9) + I(6) + 0.5I(11) + 0.5I(8),$$

$$E_{NW} = I(6) + I(4) + 0.5I(3) + 0.5I(1),$$

and the final estimate is obtained by averaging the selected directional estimates:

$$z_{interp}(x) = \frac{1}{|D_s(x)|} \sum_{d \in D_s(x)} E_d(x). \quad (3)$$

It may happen that some of the 12 neighboring pixels are unknown and hence some of the expressions in (2) cannot be computed. In this case D may consist only of those directions along which we can compute derivative moduli in (2). If none of the expressions in (2) can be computed, like in the example shown in FIG. 4C, simple average is used of the adjacent known pixels as the estimate.

In the areas where both non-saturated long exposure and short exposure pixels are available interpolation can be used to improve signal-to-noise ratio (SNR) of the short exposure pixels. In such areas, after intensity correction, noise variance in the short exposure pixels is K to $K^2$ times higher than in the long exposure pixels (given that corrected intensities of long and short exposure pixels are equal). To obtain a higher SNR estimate for a short exposure pixel we replace its value with a weighted average of its own value and the value interpolated from the neighboring long exposure pixels $$\hat{z}(x) = w(x)z_{interp}(x) + (1 - w(x))z(x),$$

$$w(x) = \frac{w_s^2(x)}{w_s^2(x) + w_l^2(x)}.$$

Here the weight $w_l(x)$ is computed as the sample variance over all long exposure pixels in the 5×5 neighborhood of x and $w_s(x) = aKz_{interp}(x) + bK^2$, where a and b are the sensor noise parameters (see below). To obtain $z_{interp}$ the same interpolation method used for interpolating saturated long exposure pixels is used.

Denoising

Figure 7:
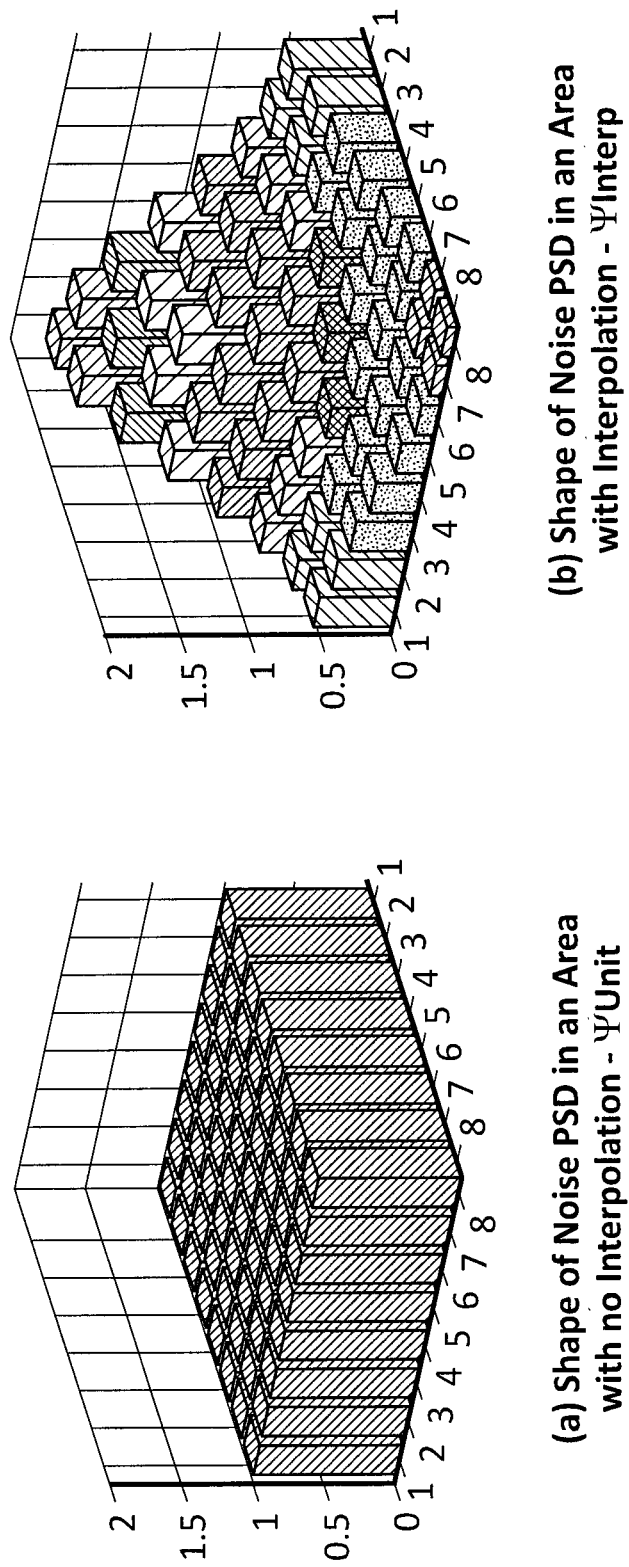
FIG. 7 illustrates example power spectral density of areas with and without interpolation, in accordance with one or more embodiments of the disclosure.

In the illustrated embodiment, the denoising step 312 is implemented using a block-matching and 3D filtering algorithm (e.g. VBM3D or VBM3D) for filtering the frames obtained after interpolation. It will be appreciated, however, that other denoising techniques may be used. In the illustrated embodiment, the system first models the noise power spectral density (PSD) in the intensity corrected and interpolated images. Referring to FIG. 7, the shape of the noise in an area with no interpolation is illustrated in chart (a) and the shape of the noise in an area with interpolation is illustrated in chart (b).

First, the noise variance in the intensity corrected images is determined. It is assumed that the noise in the raw data (prior to intensity correction and interpolation) follows the signal-dependent model $\sigma^2 (y_{raw}(x)) = ay_{raw}(x) + b$, where $\sigma^2(y_{raw}(x))$ is the variance function, $y_{raw}(x) = E(z_{raw}(x))$ is the expectation of the measured intensity $z_{raw}$, and a and b are the noise model parameters.

After intensity correction stage we have $$z_{cor}(x) = \begin{cases} z_{raw}(x), & \text{if } x \text{ is a long exposure pixel,} \\ Kz_{raw}(x), & \text{if } x \text{ is a short exposure pixel,} \end{cases} \quad (5)$$

where we assume that the camera-response function (CRF) has been linearized, such that the possible pedestal (offset) has been removed from $z_{raw}$. It is easy to check that the variance function $\sigma^2$ for the corrected data takes the form $$\sigma^2_{cor}(y_{cor}(x)) = \begin{cases} ay_{cor}(x) + b, & \text{if } x \text{ is a long exposure pixel,} \\ aKy_{cor}(x) + bK^2, & \text{if } x \text{ is a short exposure pixel,} \end{cases} \quad (6)$$

where $y_{raw}(x) = E(z_{raw}(x))$ is the expected value of $z_{cor}(x)$. The expressions for the noise PSD are then derived, starting from several special cases before giving a general formula.

Next, noise PSD of a block which does not contain interpolated pixels will be described. There are two particular cases of our interest in which none of the pixels in the block have been interpolated. In the first case, the block consists of either only long or only short exposure pixels and none of the pixels has been interpolated. In this case, the noise PSD Ψ is $$\Psi(\xi, y_{cor}) = (ay_{cor} + b)\Psi_{unit}(\xi), \text{ for long exposure,} \quad (7)$$

$$\Psi(\xi, y_{cor}) = (aKy_{cor} + bK^2)\Psi_{unit}(\xi), \text{ for short exposure,} \quad (8)$$

where $\xi \in [1, \ldots, N] \times [1, \ldots, N]$ is the index of the transform coefficient for a block of size N×N used in the block-matching and 3D filtering algorithm and $\Psi_{unit}(\cdot) = \Psi(\cdot, (1-b)/a)$ is the noise PSD corresponding to the case when $\sigma^2_{cor}(y) = 1$. In (8), equation (6) was taken into account.

In the remainder, for clarity and simplicity of notation, it is assumed that the noise in the raw data is uncorrelated, hence $\Psi_{unit} \equiv 1$ and that the transform is the DCT. However, it is possible (though often impractical) to obtain corresponding formulas also for spatially correlated raw-data noise and for an arbitrary linear transform.

In the second case, within the block, long and short exposure pixels are arranged in a checkerboard pattern (like in FIG. 4A) and none of them has been interpolated. From properties of the DCT, it follows that for each basis element the sum of squares of its components corresponding to the white positions in the checkerboard is equal to 0.5. The same holds for the sums computed over the squares of the components corresponding to the black positions. Taking this into account and assuming that the noise is uncorrelated:

$$\Psi(\xi, y_{cor}) = \left[\frac{1}{2}(ay_{cor} + b) + \frac{1}{2}(aKy_{cor} + bK^2)\right] \quad (9)$$

$$\Psi_{unit}(\xi) = \left[\left(\frac{1}{2} + \frac{1}{2}K\right)ay_{cor} + \left(\frac{1}{2} + \frac{1}{2}K^2\right)b\right]\Psi_{unit}(\xi).$$

Formulas (7)-(9) may be combined into $$\Psi(\xi, y_{cor}) = \rho(ay_{cor} + b)\Psi_{unit}(\xi) + (1-\rho)(aKy_{cor} + bK^2)$$
$$\Psi_{unit}(\xi) = [(\rho + (1-\rho)K)ay_{cor} + (\rho + (1-\rho)K^2)b]$$
$$\Psi_{unit}(\xi). \quad (10)$$

The parameter $\rho \leq 1$ is the proportion of long exposure pixels in the block, which we compute as $$\rho = \frac{1}{|B|}\sum_{x \in B} p_{long}(x), \quad (11)$$

$$p_{long}(x) = \begin{cases} w(x), & \text{if } x \text{ is an interpolated short exposure pixel,} \\ 0, & \text{if } x \text{ is not an interpolated short exposure pixel,} \\ 0, & \text{if } x \text{ is a saturated long exposure pixel,} \\ 1, & \text{if } x \text{ is not an interpolated long exposure pixel} \end{cases}$$

Here B is the set of spatial coordinates corresponding to the pixels in the block. It is easy to check that for the cases described by formulas (7), (8) and (9) ρ evaluates respectively to ρ=1, ρ=0 and ρ=0.5 making (10) to coincide with (7), (8) and (9).

Next, the PSD of a block containing interpolated pixels will be described. Proceeding to the cases with interpolation, the shape of the PSD varies significantly between areas with and without interpolation (see FIG. 7, chart (b)). If all pixels at white (alternatively black) positions are of a unique type (i.e., $\rho \in \{0, 1\}$) and are used for interpolating the pixels values at the black (alternatively white) positions, then $$\Psi(\xi, y_{cor}) = [(\rho + (1-\rho)K)ay_{cor} + (\rho + (1-\rho)K^2)b]\Psi_{interp}(\xi). \quad (12)$$

where $\Psi_{interp}$ is the PSD of an image where pixels at white positions are uncorrelated zero-mean random noise with unit variance and pixels at black positions are interpolated from the given random ones at white positions.

To handle PSD for the general case, the formula for the general case is obtained by combining formulas (10) and (12):

$$\Psi(\xi, y_{cor}) = [(\rho + (1-\rho)K)ay_{cor} + (\rho + (1-\rho)K^2)b] \times ((1-2\mu)$$
$$\Psi_{unit}(\xi) + 2\mu\Psi_{interp}(\xi)). \quad (13)$$

Here $\mu \leq 0.5$ is the proportion of interpolated pixels in the block B:

$$\mu = \frac{1}{|B|}\sum_{x \in B} p_{interp}(x), \quad (14)$$

$$p_{interp}(x) = \begin{cases} w(x), & \text{if } x \text{ is an interpolated short exposure pixel,} \\ 0, & \text{if } x \text{ is not an interpolated short exposure pixel,} \\ 1, & \text{if } x \text{ is a saturated long exposure pixel,} \\ 0, & \text{if } x \text{ is not an interpolated long exposure pixel} \end{cases}$$

If no interpolation takes place in the block we have μ=0 and formula (13) coincides with (10). In the above interpolation cases, μ=0.5 and (13) coincides with (12). Hence (13) provides correct expressions for the PSD in the cases covered above (which are determined to be the most significant cases). In other cases (13) provides only an approximate result.

Since the disclosed interpolation method is data-adaptive, the noise correlation in the interpolated images is not going to be stationary. This means that $\Psi_{interp}$ will be data dependent. In practice we replace the true $\Psi_{interp}$ with an approximation obtained via a Monte-Carlo simulation and representing averaged correlation effect. Formulas (11), (13) and (14) define the PSD for a single block. To obtain the PSD for a 3-D spectrum of a group of $N_{bl}$ blocks, the algorithm first averages $\mu$ and $\rho$ over all blocks as follows:

$$\mu = \frac{1}{\sum_{i=1}^{N_{bl}} |B_i|} \sum_{i=1}^{N_{bl}} \sum_{x \in B_i} p_{interp}(x), \quad (15)$$

$$\rho = \frac{1}{\sum_{i=1}^{N_{bl}} |B_i|} \sum_{i=1}^{N_{bl}} \sum_{x \in B_i} p_{long}(x), \quad (16)$$

then computes the 2-D PSD using (13), and finally replicates the obtained 2-D PSD along third the dimension $N_{bl}$ times.

The effectiveness of the HDR imaging algorithm has been demonstrated in practice using synthetically generated test data obtained from real video sequences. FIGS. 5 and 6 show the different processing stages of the frames respectively from car and office sequences, respectively. For a comparison the figures also show the same frames entirely acquired using short exposure and their denoising results, as well as the frames entirely acquired using long exposure. As shown, the disclosed HDR imaging algorithm allows images to be obtained with significantly better preservation of image details compared to the case when frames are captured using only short exposure. This is noticeable particularly well in the areas around front wheel in FIG. 5 and on the face of the person on the right in FIG. 6.

Figure 8:
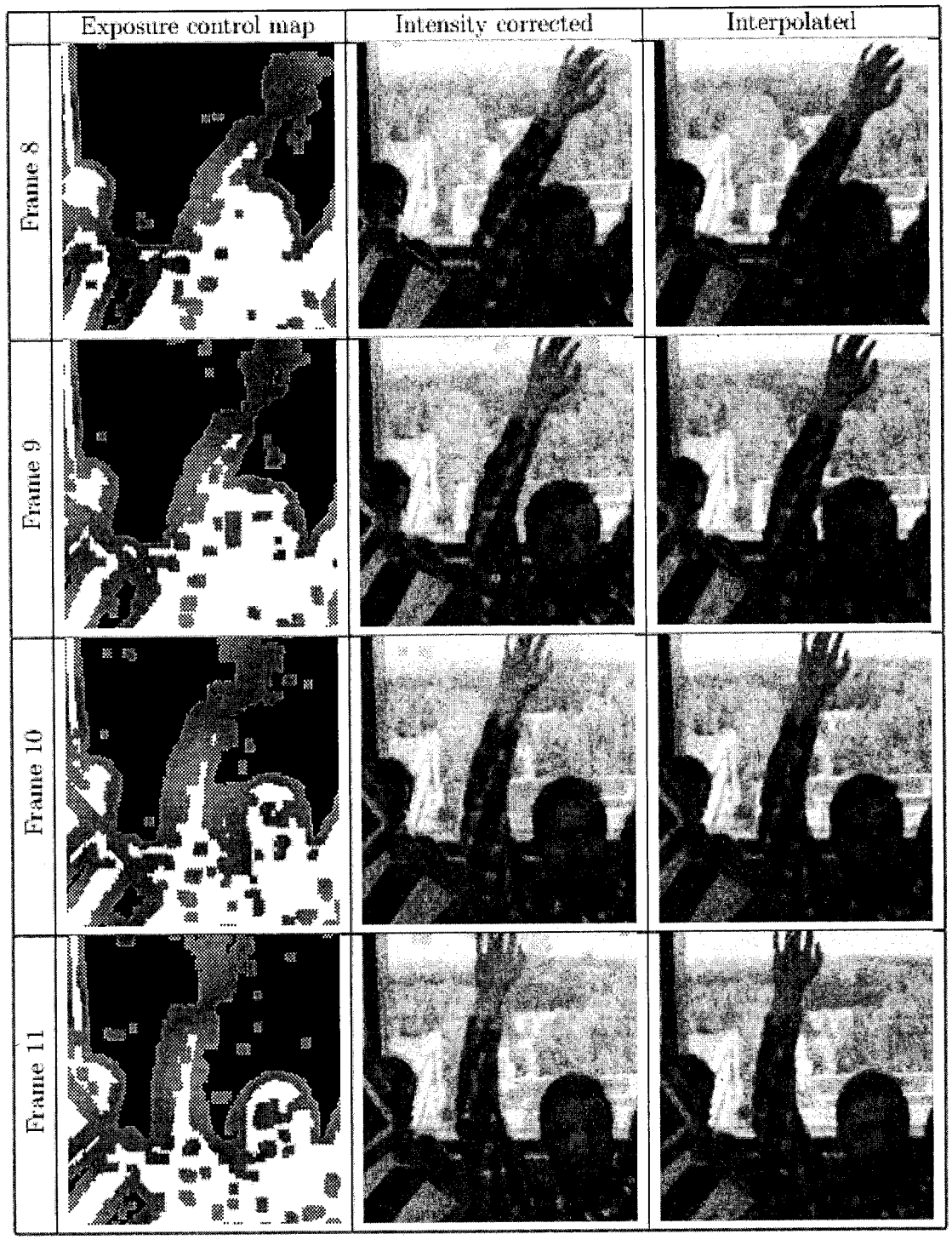
FIG. 8 illustrates an example of frame by frame processing in accordance with one or more embodiments of the disclosure.

Visual examination of the denoised HDR test images shows that formula (13) provides an accurate enough approximation of the actual PSD, allowing the block-matching and 3D filtering algorithm to handle noise reasonably well in the different parts of the image: with predominantly long or short exposure, in the areas having both exposure types, as well as in the regions with transition from one area type to another. Finally, in FIG. 8 illustrates how the algorithm modifies the exposure control map predicting locations of saturated pixels in the future frame. Prediction accuracy can be evaluated by examining the saturated pixels in the intensity corrected images shown in the middle column of FIG. 8.

In various implementations, saturated pixels mainly appear near the boundaries between dark objects (human head and hand) and bright background, where the algorithm has low confidence in prediction. Most of the saturated pixels will have enough known pixels next to them to recover saturated pixel values by interpolation (rightmost column in FIG. 8 shows the interpolation results). Yet, one can notice three small patches in frames 9 and 10 having solid red color, which indicates that all pixels in that patches are saturated. Comparing frames 8 and 10 the three patches correspond to the part of bright background which has been covered by a dark object in one frame but became visible in the next frame. It may not be practical to completely avoid such situations, but chances of getting them can be lowered by elaborating the prediction algorithm. If however, an area with completely saturated pixels is obtained it can be filled using an inpainting algorithm (e.g., Matlab's regionfill function).

In practice, it can be hard to achieve one-to-one correspondence between DMD micromirrors and sensor photodetectors. In one or more embodiments, practical systems may implement a small point-spread function between the DMD micromirrors and the sensor photodetectors. It may cause the actual pixel exposure map to be a blurred version of the exposure map considered above. First, the small point-spread function may be used in the intensity correction step. Instead of simply dividing short exposure pixels by K the system may correct exposures of all pixels taking into account their actual exposures. Second, the small point-spread function may be used in the denoising step, where formulas (13) may be adjusted to take into account changes in the pixels' variances due to intensity correction step.

Frame Rate Upsampling

Various embodiments of the present disclosure further include systems and methods to increase the frame rate of an imaging system by use of the digital micromirror device (DMD). A DMD optical element is used to encode multiple short integrations (at increased frame rate) into a single integration (at the sensor's native frame rate). Each pixel in the frame is "encoded" with an independent binary sequence (on/off being the state of the corresponding mirror in the DMD); the length of the sequence is typically the increase ratio of the frame rate. A matched "decoding" algorithm, based on denoising filters may be used to reconstruct a video sequence at the increased frame rate. The increased frame-rate can be as high as the frame rate of the DMD (KHz range). In practice a 3-10 fold increase is achievable in practical implementations. The method is based on compressive sensing theory, which enables this type of recovery given sufficient knowledge of the target signal class, which is modeled internally by the denoising filter.

Temporal upsampling systems based on conventional low-frame rate input may suffer from noticeable artifacts in situations involving occlusions, i.e. when an object moves in front of another during the missing frames. The proposed system is able to significantly reduce the amount of artifacts given the same frame-rate of the sensor. An image sensor and ROIC may not be able to operate at frame rates above, for example, 50 Hz. For some events it is desirable to image at much higher frame rates. Using the upsampling method disclosed herein, the system frame rate limit may be determined by the switching rate of the digital micromirror device. A system like this also allows for spatially variable frame rates. For example the center of the image can be updated at a higher rate than the edges of the image thus saving bandwidth and reducing the overall computational load.

In one or more embodiments, systems and methods use a digital micromirror device (DMD) optical element to effectively encode each video frame as the result of multiple short integrations instead of a single short integration. The DMD is a micro-opto-electro-mechanical device capable of modulating light with a high spatio-temporal resolution compared to the imaging sensor and ROIC. A matched decoding algorithm is provided that reconstructs a video sequence that has a higher frame-rate than the frame-rate limit of the optical image sensor and ROIC. The frame rate upsampling embodiments reduce motion artifacts characteristic of denoising techniques, such as used in the block-matching and 3D filtering algorithm discussed above (e.g., VBM3D or VBM4D), particularly in situations involving occlusions.

Figure 9:
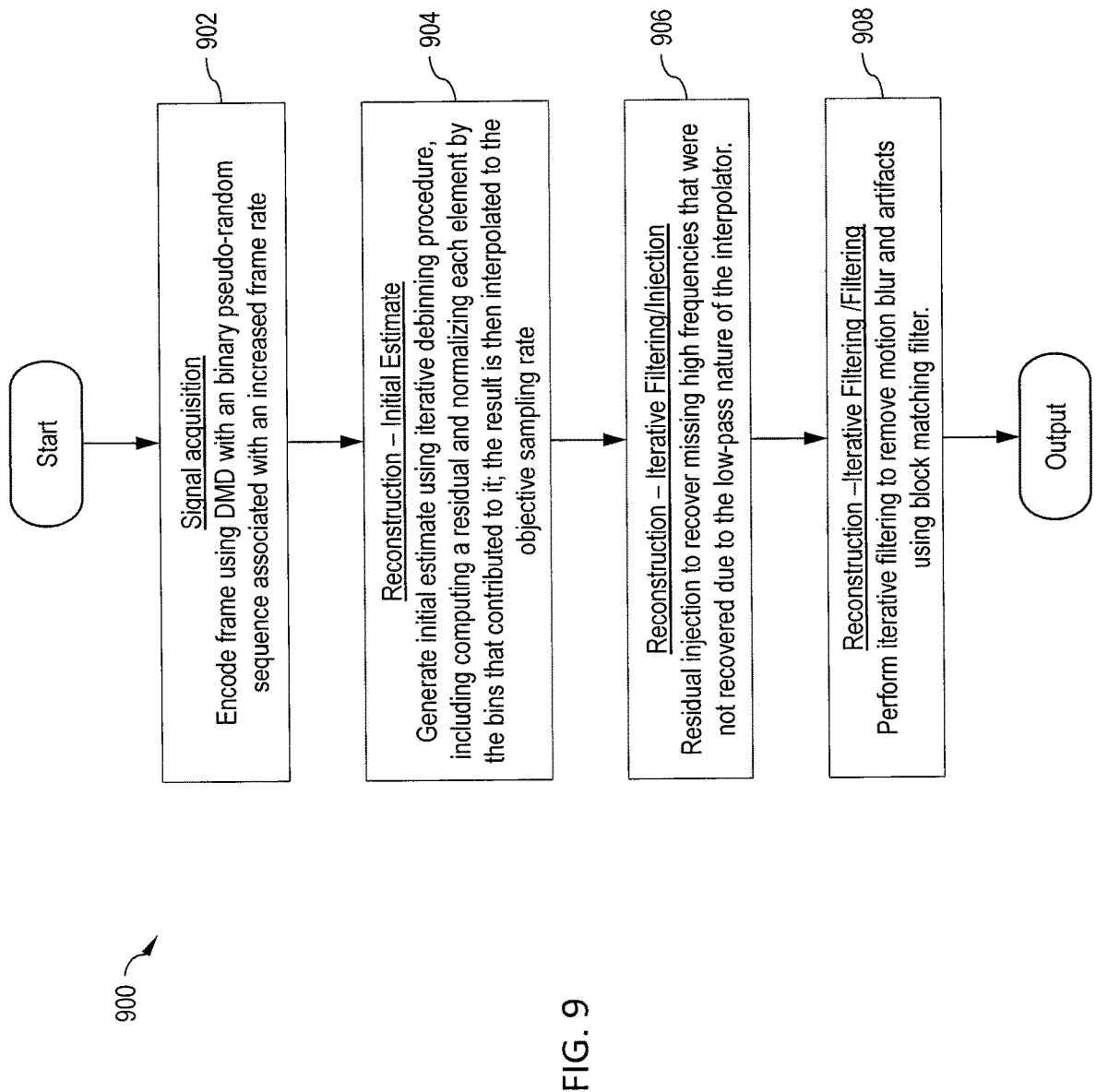
FIG. 9 is a block diagram of a frame rate upsampling algorithm using a digital micromirror device, in accordance with one or more embodiments of the disclosure.

Referring to FIG. 9 an embodiment of an upsampling procedure 900 will now be described. In various embodiments, a system operates in two main stages: signal acquisition and then reconstruction. Signal acquisition in step 902 may be performed using pseudo-random samplers. The reconstruction procedure is based on prior knowledge of the signal properties and consists of a search for the best fit to the available measurements. A system in accordance with one or more embodiments includes a sampling simulator and a reconstruction component. The sampling simulator first attempts to perform a realistic, simplified, simulation of the sampling procedure to provide information on the expected performance of an actual system. The reconstruction component, as previously mentioned, uses prior knowledge about the spatio-temporal signal structure. For illustrative purposes, the embodiment disclosed below assumes an upsampling factor of F=3, or, $F_H=3F_L$. It will be appreciated that other scaling factors may be used within the spirit and scope of the present disclosure.

The illustrated sampling scheme includes two components: a DMD operating at high sampling rate $F_H$ and an imaging sensor operating at a lower sampling rate, $F_L$. In order to simulate the combined operating of these two components, the following assumptions were made: there is a direct pixel-to-pixel correspondence between the DMD mirrors and the imaging sensor photodetectors, with an ideal Dirac-delta Point Spread Function (PSF); the DMD is capable of an "on" state and an "off" state; the DMD and the imaging sensor operate synchronously; the $F_H$ is an integer multiple of $F_L$; and the imaging sensor has a linear response. Given these assumptions, the sampling procedure can be simulated as pixel-wise and operating in $F=F_H/F_L$ input frames at a time.

In line with compressive sensing theory, the DMD is operated with a pattern that exhibits no correlation with the input signal or the reconstruction procedure. This pattern is referred to as binary pseudo-random pattern A (pattern A).

For each set of F input frames $y \in R^{H \times W \times F}$, a single output frame $z \in R^{H \times W}$ is generated. Due to the assumed linearity of the imaging sensor and the binary pattern encoded in the DMD, each element of z is the result of a binary linear combination of the corresponding pixels in y. The coefficients of this linear combination result from the pattern $A \in R^{H \times W \times F}$ encoded in the DMD:

$$z_{(h,w)} = \sum_{f=1}^{F} A_{(h,w,f)} y_{(h,w,f)}$$

The pseudo-random binary pattern A is built F pixels at a time. Each set of F consecutive pixels along the temporal dimension correspond to the binary representation of a randomly selected number $\alpha \in [1, 2^F-1]$. Omitting 0 from the possible events prevents the all zeros mask from being used. A sampling example can be seen in FIG. 10.

Reconstruction starts with an initial estimate in step 904. The procedure used to estimate the original sequence y, knowing the measurements z and the sampling mask A starts with the generation of an initial estimate. The initial estimate is obtained using an iterative debinning procedure that assumes z was obtained through temporal binning. This iterative procedure starts with an initial estimate of 0. In each iteration, the residual is computed and each element is normalized by the bins (samples) that contributed to it (number of ones in the mask). The result is then interpolated to the objective sampling rate using a spline interpolator.

Reconstruction continues with iterative filtering. The generated initial estimate may contain motion blur and artifact. In order to improve this estimate, an iterative back projection scheme is used where a slightly modified version of the block-matching filter (e.g., VBM3D or VBM4D) is employed as a regularizer. The filter is iteratively applied, starting with a strong regularization factor which is gradually reduced until only very mild regularization is used. In one embodiment, the iterative scheme is composed of two steps: residual injection (step 906) and filtering (step 908).

The residual injection step of the reconstruction iterative scheme aims to recover the missing high frequencies that were not recovered due to the low-pass nature of the interpolator. Knowing the measurement process, the residual at iteration k+1 can be computed from the previous estimate $\hat{y}_k$ as:

$$r_{k+1} = A^{-1}(z - A\hat{y}_k)$$

This residual is added to the current estimate with strength a, generating the signal to be filtered, $\hat{y}_k^r$.

$$\hat{y}_{k+1}^r = \alpha r + \hat{y}_k$$

The filtering step of the reconstruction iterative scheme is based on the previously delivered filter (e.g., from VBM3D or VBM4D). In order to be able to better suppress the artifacts present in the time domain without introducing excessive spatial blur, the system differentiates between spatial and temporal thresholding. In order to do so, the following parameters are introduced: $\lambda_{DC}$ and $\lambda_{AC}$.

The block matching procedure is sensitive to the artifacts generated by the initial estimate generator. In order to mitigate the effect of these artifacts, the block matching used for the hard-thresholding stage is performed on a temporally smoothed version of the input. In practice this was achieved by allowing the user to pass to the filter the sequence that should be used for the hard-thresholding block matching. This sequence was then generated outside the filter using a moving average on the signal to be filtered. Furthermore, for improved performance, a Wiener stage may be used.

Parameters used during reconstruction will be described. For both the debinning and reconstruction procedures, the number of used iterations is a parameter that allows a trade-off between speed and reconstruction quality. For each iteration of the reconstruction procedure, the following parameters are used: residual injection strength, $\alpha$; regularization strength, $\sigma$; threshold factor for DC coefficients, $\lambda_{DC}$; threshold factor for AC coefficients, $\lambda_{AC}$; and amount of temporal smoothing for block matching. These parameters may be determined, for example, through use of test sequences and may be fixed in various implementations. The performance of the system might be however sub-optimal when other sequences are used, and the parameters may be adjusted.

Figure 10:
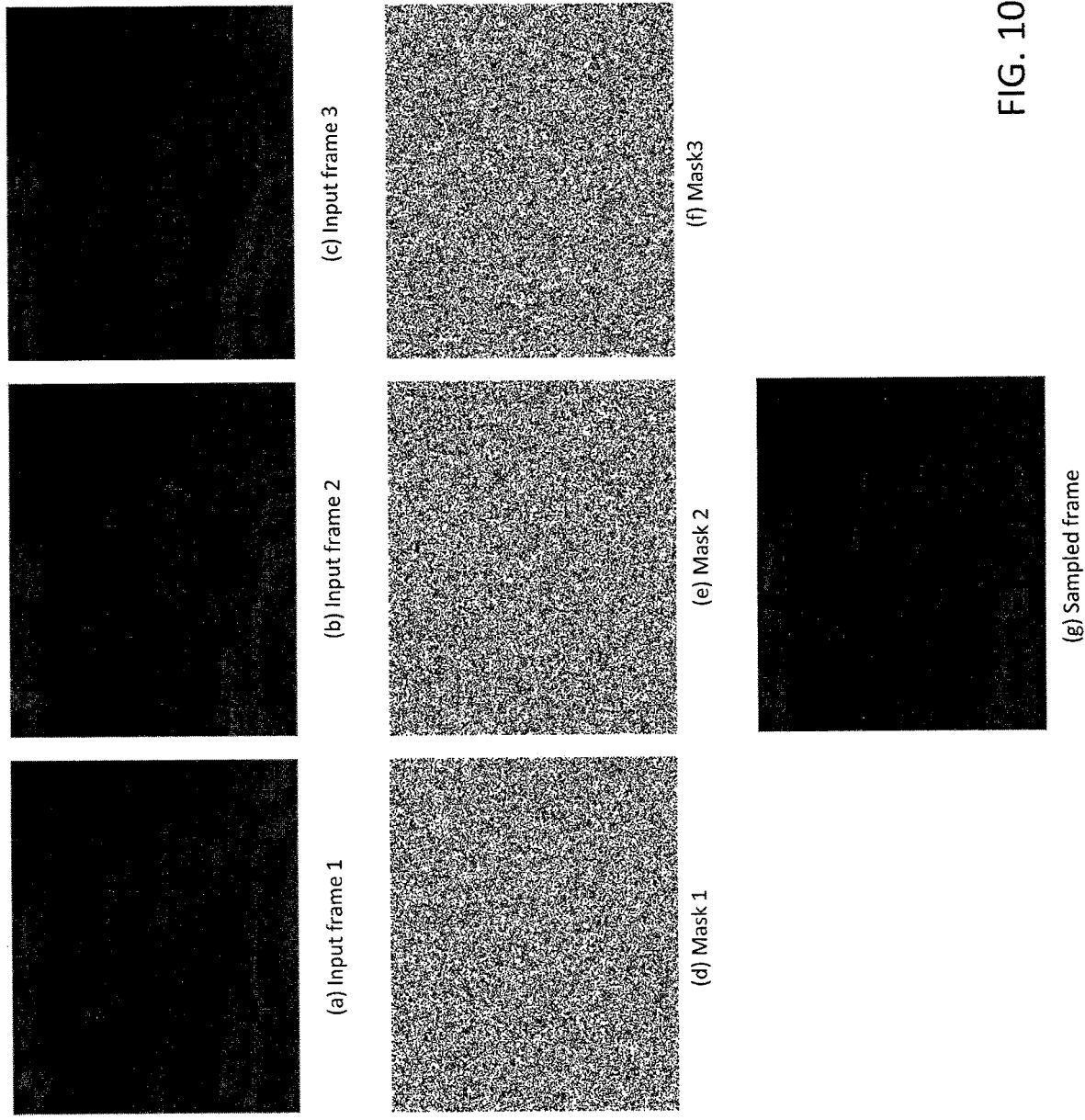
FIG. 10 illustrates a sampling example in accordance with one or more embodiments of the disclosure.
Figure 11:
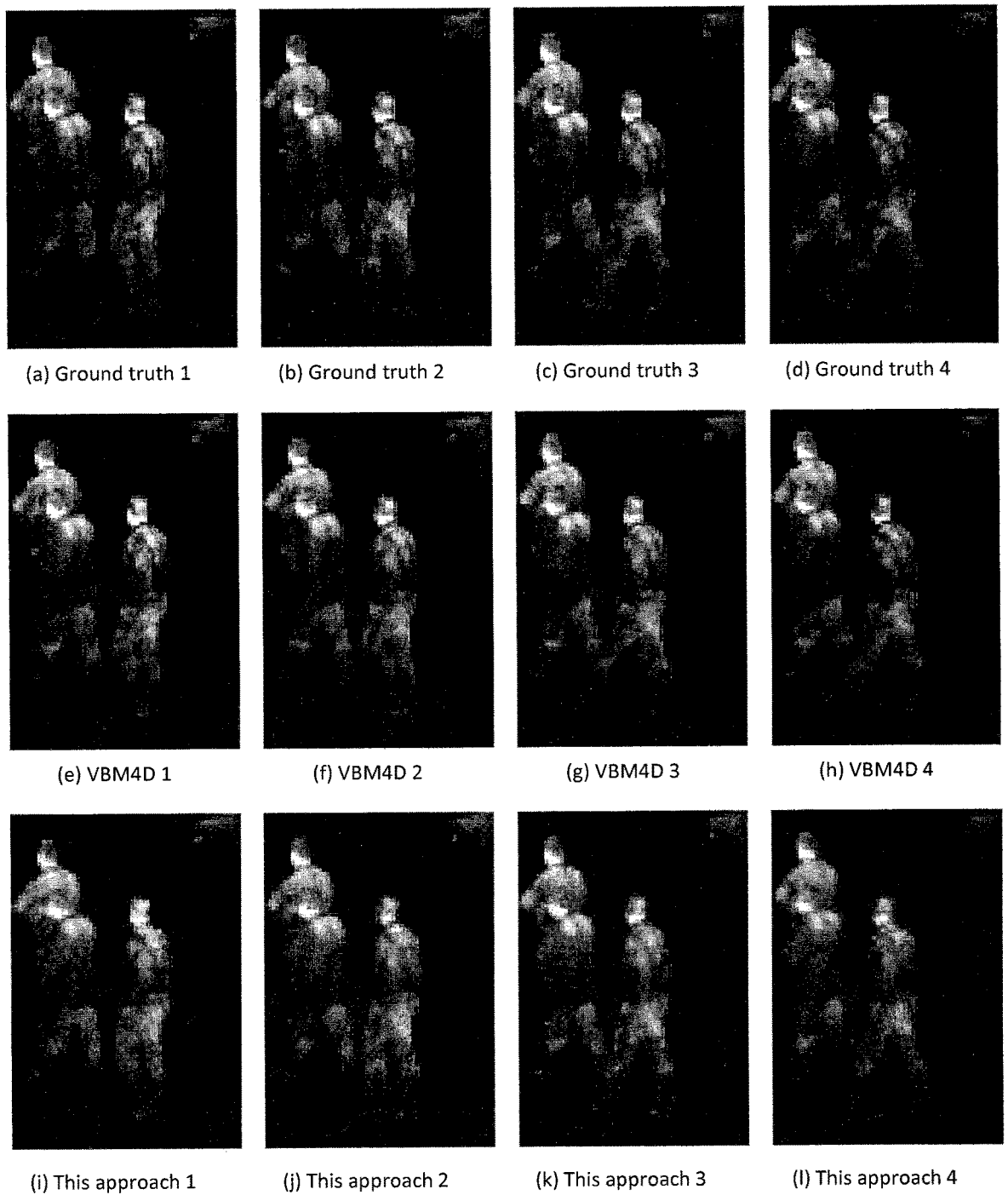
FIG. 11 illustrates an example of upsampling results in accordance with one or more embodiments of the disclosure.

FIG. 10 shows experimental results using an upsampling factor of 3 on a difficult sequence of frames, which illustrates the difference between the results obtained using this approach and the VBM4D filter. As one can observe, despite generating noisier results, this approach is able to avoid motion artifacts. Note that while for VBM4D, the first and last frames are keyframes, for this approach all frames are treated equal and have to be reconstructed in the same way. On keyframes VBM4D performs only denoising, therefore the perceived quality is superior to the current approach. However, on other frames, the current approach shows superior motion reconstruction.

The computational complexity of this system is proportional to the complexity of VBM4D filter, growing linearly with the number of iterations of the reconstruction procedure. The computational complexity of the added logic, including the debinning procedure is negligible when compared to that of the filter.

In various implementations, a practical realization of this system may not be able to meet all the constraints assumed during the sampling simulation. However, of those constraints, only the synchronicity between the DMD and the imaging sensor are critical for the correct functioning of this approach. It is known that better trade-off between spatial and temporal accuracies can be achieved by adapting the design of mask A to the statistical properties of the previous samples, without incurring significant computational requirements.

The system and methods disclosed herein successfully leverage a DMD to perform frame-rate upsampling while avoiding motion artifacts. Furthermore, it does so taking advantage of previously developed and delivered technology.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
an image sensor operable to capture an image of a scene, the image sensor comprising an array of photodetector sensors operable to capture an image of a scene at a first frame rate, and a readout integrated circuit (ROIC) operable to generate signals from the photodetector sensors corresponding to the captured image of the scene;
a digital micromirror device (DMD) comprising a plurality of micromirrors, each micromirror having at least two physical states, and control circuitry operable to separately control the state of each micromirror, the digital micromirror device operable to receive the image of a scene and reflect the image to the image sensor, whereby the image sensor captures the reflected image of the scene; and
a processing component operable to control the operation of the DMD and reconstruct the image from the ROIC, by computing an exposure control map for controlling the micromirrors of the DMD during image capture, capturing via the ROIC a frame of the image received from the DMD, and updating the exposure control map for the next image based at least in part on an analysis of the current frame.

2. The system of claim 1, wherein the processing component is further operable to: correct pixel intensity in the captured frame;
detect saturated pixels; and
perform interpolation to adjust pixel values.

3. The system of claim 2, wherein the processing component is further operable to:
perform a denoising procedure on the current frame; and
generate a saturation prediction map for a next image frame, the saturation prediction map based on the current frame;
wherein the saturation prediction map is generated by receiving block-matching information from the denoising processing of the current frame and constructing motion vectors for blocks in the current frame.

4. The system of claim 3, wherein the processing component is further operable to:
generate the saturation prediction map by predicting positions of reference blocks in the next frame;
aggregate reference blocks in minimum and maximum buffers;
construct the saturation prediction map by comparing minimum/maximum buffers against saturation levels; and
update the exposure control map based on the saturation prediction map.

5. The system of claim 1, wherein the processing component is further operable to upsample the frame rate using the DMD, including acquiring a frame of an image signal and encoding the frame using the DMD with a binary pseudo-random sequence associated with the increased frame rate.

6. The system of claim 5, wherein the processing component is further operable to upsample the frame rate using the DMD, performing a reconstruction step including generating an initial estimate using an iterative debinning procedure, including computing a residual and normalizing each element by the bins that contributed to the estimate, and interpolating the result to the objective sampling rate.

7. The system of claim 6, wherein the processing component is further operable to:
upsample the frame rate using the DMD, performing a reconstruction step including performing residual injection to recover missing high frequencies that were not recovered due to the low-pass nature of the interpolator; and
upsample the frame rate using the DMD, performing a reconstruction step of filtering including performing iterative filtering to remove motion blue and artifacts using a block matching filter.

8. A method comprising:
capturing an image of a scene at a first frame rate using an image sensor comprising an array of photodetector sensors to generate signals corresponding to the captured image of the scene;
operating a digital micromirror device (DMD) comprising a plurality of micromirrors, each micromirror having at least two physical states, and wherein operating the DMD comprises separately controlling the state of each micromirror, the DMD operable to receive the image of a scene and reflect the image to the image sensor, whereby the image sensor captures the reflected image of the scene; and controlling the micromirrors of the DMD in accordance with an exposure control map during image capture;

capturing via the ROIC a frame of the image received from the DMD;

updating the exposure control map for the next image based at least in part on an analysis of the current frame; and reconstructing the image received from the ROIC.

9. The method of claim 8, further comprising:
capturing a frame of the image received from the DMD;
correcting pixel intensity in the captured frame; and
detecting saturated pixels in the captured frame.

10. The method of claim 9, further comprising:
perform interpolation to adjust pixel values; and
performing a denoising procedure on the current frame.

11. The method of claim 10, further comprising generating a saturation prediction map for a next image frame, the saturation prediction map based on the current frame.

12. The method of claim 11, further comprising generating the saturation prediction map by receiving block-matching information from the denoising processing of the current frame; and constructing motion vectors for blocks in the current frame.

13. The method of claim 12, further comprising generating the saturation prediction map by predicting positions of reference blocks in the next frame and aggregating reference blocks in minimum and maximum buffers.

14. The method of claim 13, further comprising constructing the saturation prediction map by comparing minimum/maximum buffers against saturation levels; and
updating the exposure control map based at least in part on the saturation prediction map.

15. The method of claim 14, further comprising upsampling the frame rate using the DMD, including acquiring a frame of an image signal and encoding the frame using the DMD with a binary pseudo-random sequence associated with the increased frame rate.

16. The method of claim 15, further comprising upsampling the frame rate using the DMD, performing a reconstruction step including generating an initial estimate using an iterative debinning procedure, including computing a residual and normalizing each element by the bins that contributed to the estimate, and interpolating the result to the objective sampling rate.

17. The method of claim 16, further comprising upsampling the frame rate using the DMD, performing a reconstruction step including performing residual injection to recover missing high frequencies that were not recovered due to the low-pass nature of the interpolator.

18. The method of claim 17, further comprising upsampling the frame rate using the DMD, performing a reconstruction step of filtering including performing iterative filtering to remove motion blue and artifacts using a block matching filter.

* * * * *